United States Patent
Beever et al.

(10) Patent No.: US 9,475,395 B2
(45) Date of Patent: Oct. 25, 2016

(54) VEHICLE CONTROL SYSTEM AND METHOD TO PROVIDE DESIRED WHEEL SLIP

(71) Applicant: Jaguar Land Rover Limited, Coventry (GB)

(72) Inventors: Paul Beever, Coventry (GB); Michael Blyth, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/406,613

(22) PCT Filed: Jun. 11, 2013

(86) PCT No.: PCT/EP2013/062017
§ 371 (c)(1),
(2) Date: Dec. 9, 2014

(87) PCT Pub. No.: WO2013/186208
PCT Pub. Date: Dec. 19, 2013

(65) Prior Publication Data
US 2015/0175009 A1 Jun. 25, 2015

(30) Foreign Application Priority Data
Jun. 11, 2012 (GB) .................................. 1210282.8

(51) Int. Cl.
*B60W 30/02* (2012.01)
*B60K 28/16* (2006.01)
(Continued)

(52) U.S. Cl.
CPC .............. *B60L 3/106* (2013.01); *B60K 7/0007* (2013.01); *B60L 15/20* (2013.01); *B60L 15/36* (2013.01);
(Continued)

(58) Field of Classification Search
CPC ..... B60L 15/36; B60L 3/0061; B60K 28/16; B60K 6/46; B60T 8/175; B60T 8/172; B60W 10/08; B60G 17/0195; F02D 11/105

USPC ..... 701/22, 67, 69, 90, 84, 99, 76; 180/197; 303/187
See application file for complete search history.

(56) References Cited

U.S. PATENT DOCUMENTS 3,684,047 A * 8/1972 Zeisloft ................. B60K 28/16
180/197
5,117,934 A 6/1992 Tsuyama et al.
(Continued)

FOREIGN PATENT DOCUMENTS

DE 196 53 855 C1 4/1998
EP 0 554 838 A1 8/1993
(Continued)

OTHER PUBLICATIONS

Patents Act 1977: Search Report under Section 17(6), Claim 28, Application No. GB1310344.5, Jul. 10, 2014, 2 pages.
(Continued)

Primary Examiner — Yuri Kan
(74) Attorney, Agent, or Firm — Myers Bigel & Sibley, P.A.

(57) ABSTRACT

The invention relates to a control system and methods for controlling motion of a vehicle over a surface. The control system limits an amount of drive torque that may be applied to one or more wheels of the vehicle to prevent an amount of wheel slip from exceeding a prescribed value. The prescribed value of wheel slip is determined in dependence at least in part on vehicle speed. In addition, method claims 28 and 29 are directed to providing drive torque, independent of vehicle speed, which corresponds to or exceeds the maximum traction force. These methods are suitable for highway driving with high friction or off road driving on soft terrain, respectively.

20 Claims, 3 Drawing Sheets

(51) Int. Cl.

| | | |
|---|---|---|
| *B60L 3/10* | (2006.01) | |
| *B60K 7/00* | (2006.01) | |
| *B60L 15/20* | (2006.01) | |
| *B60L 15/36* | (2006.01) | |
| *B60W 50/08* | (2012.01) | |
| *B60W 10/08* | (2006.01) | |
| *B60W 30/18* | (2012.01) | |
| *B60W 50/00* | (2006.01) | |

(52) U.S. Cl.
CPC ....... *B60W 30/02* (2013.01); *B60K 2007/0092* (2013.01); *B60W 10/08* (2013.01); *B60W 30/18027* (2013.01); *B60W 50/082* (2013.01); *B60W 2050/0012* (2013.01); *B60W 2520/10* (2013.01); *B60W 2540/10* (2013.01); *B60W 2550/148* (2013.01); *B60W 2720/26* (2013.01); *B60W 2720/30* (2013.01); *B60W 2720/403* (2013.01); *B60W 2720/406* (2013.01); *Y02T 10/7258* (2013.01)

(56) References Cited

U.S. PATENT DOCUMENTS

| | | | | |
|---|---|---|---|---|
| 5,243,526 A * | 9/1993 | Ito | ............. | B60K 28/16 180/177 |
| 5,325,300 A | 6/1994 | Tsuyama et al. | | |
| 6,312,065 B1 * | 11/2001 | Freitag | ............. | B60G 17/0195 303/186 |
| 6,324,460 B1 * | 11/2001 | Lehmer | ............. | B60T 8/172 701/71 |
| 7,979,189 B2 * | 7/2011 | Nihei | ............. | B60W 10/08 180/197 |
| 2004/0211609 A1 | 10/2004 | Schmitt | | |
| 2006/0036361 A1 * | 2/2006 | Romer | ............. | B60K 28/16 701/84 |
| 2008/0264709 A1 * | 10/2008 | Fenker | ............. | B60K 28/16 180/197 |
| 2009/0012670 A1 * | 1/2009 | Gruenter | ............. | F02D 11/105 701/84 |
| 2009/0112437 A1 * | 4/2009 | Luehrsen | ............. | B60T 8/175 701/84 |
| 2009/0132141 A1 | 5/2009 | Hrovat et al. | | |
| 2010/0161188 A1 * | 6/2010 | Turski | ............. | B60T 8/175 701/67 |
| 2010/0161194 A1 | 6/2010 | Turski et al. | | |
| 2012/0116641 A1 * | 5/2012 | Crosman, III | ............. | B60K 6/46 701/84 |
| 2012/0185143 A1 * | 7/2012 | Ohno | ............. | B60L 3/0061 701/99 |

FOREIGN PATENT DOCUMENTS

| | | |
|---|---|---|
| EP | 0 749 863 A2 | 12/1996 |
| EP | 1 535 786 A1 | 6/2005 |
| EP | 2 351 678 A1 | 8/2010 |
| EP | 2 295 301 A1 | 3/2011 |
| EP | 2 505 414 A1 | 10/2012 |
| GB | 2 446 419 A | 8/2008 |
| GB | 2 454 336 A | 5/2009 |
| GB | 2 486 072 A | 6/2012 |
| GB | 2 486 177 A | 6/2012 |
| GB | 2 500 698 A | 10/2013 |
| JP | 2-275033 A | 11/1990 |
| JP | 2-305333 A | 12/1990 |
| JP | 3-281469 A | 12/1991 |
| JP | 4-055157 A | 2/1992 |
| JP | 4-292252 A | 10/1992 |
| JP | 4-293651 A | 10/1992 |
| JP | 2606261 B2 | 4/1997 |
| JP | 9-170916 A | 6/1997 |
| JP | 2006-34012 A | 2/2006 |
| JP | 2008-167624 A | 7/2008 |
| JP | 2009-298277 A | 12/2009 |
| JP | 2011-229286 A | 11/2011 |

OTHER PUBLICATIONS

Patents Act 1977: Search Report under Section 17(6), Claim 29, Application No. GB1310344.5, Jul. 10, 2014, 2 pages.
International Search Report, PCT/EP2013/062017, Mar. 17, 2014, 8 pages.
Combined Search and Examination Report, Application No. GB1210282.8, Oct. 12, 2012, 8 pages.
Combined Search and Examination Report, Application No. GB1310344.5, Dec. 10, 2013, 9 pages.
Pusca et al., "Modeling and simulation of a traction control algorithm for an electric vehicle with four separate wheel drives," 2002 IEEE 56$_{th}$ Vehicular Technology Conference Proceedings, Vancouver, CA, Sep. 24-28, 2002, vol. 3, pp. 1671-1675.
Office Action Summary, Japanese Application No. 2015-515550, Mar. 8, 2016, 2 pages.

* cited by examiner

VEHICLE CONTROL SYSTEM AND METHOD TO PROVIDE DESIRED WHEEL SLIP

RELATED APPLICATIONS

This application is a 35 U.S.C. §371 national stage application of PCT Application No. PCT/EP2013/062017, filed on Jun. 11, 2013, which claims priority from Great Britain Patent Application No. 1210282.8, filed on Jun. 11, 2012, the contents of which are incorporated herein by reference in their entireties. The above-referenced PCT International Application was published in the English language as International Publication No. WO 2013/186208 A2 on Dec. 19, 2013.

FIELD OF THE INVENTION

The present invention relates to motor vehicles and in particular, but not exclusively, to a method of determining a speed of a motor vehicle.

BACKGROUND

Traction control systems, also known as anti-slip regulation (ASR) systems, are used on vehicles to prevent loss of traction of the driven wheels so as to maintain control of the vehicle and to prevent deterioration of the accelerating performance due to longitudinal slip of the driving wheels. Traction control is necessary, for example, when excessive accelerator input is applied by the driver whilst driving on a road and the condition of the road surface is such that it is unable to cope with the torque applied.

Feedback control methods are typically employed in such systems, whereby the slip of the driving wheels (wheel slip) is monitored and, when it becomes excessive due to an excessive driving torque (e.g. sudden application of the accelerator pedal), appropriate action is taken to reduce the engine output and/or to apply a braking force to the driving wheels. For example a traction control system may signal an engine control unit (ECU) of the vehicle to reduce engine torque by retarding or suppressing the spark to one or more cylinders of the engine, reducing fuel supply to one or more of the engine cylinders, closing the throttle, or, in turbocharged vehicles, actuating the boost control solenoid to reduce boost and therefore engine power. Additionally, the wheel brake to one or more of the wheels may be applied to control wheel slip.

Traction control systems are typically implemented in a vehicle as part of a stability control system (SCS) operable to enhance stability of a vehicle by detecting and reducing skidding. If a skid is detected whilst cornering, the stability control system is arranged automatically to apply braking to individual wheels to assist a driver in steering the vehicle in an intended direction, for example around a corner.

It is desirable to provide a vehicle having improved stability. This is particularly important in certain applications, for example in vehicles having electric propulsion motors. This is because electric propulsion motors are capable of delivering relatively high values of drive torque and relatively high rates of increase of drive torque.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller.

STATEMENT OF THE INVENTION

Embodiments of the invention may be understood with reference to the appended claims.

Aspects of the present invention provide a vehicle and a method.

A control system for controlling motion of a vehicle over a surface, the control system being operable to limit an amount of drive torque that may be applied to one or more wheels of the vehicle that are arranged to be driven to a prescribed torque value so as to prevent an amount of wheel slip from exceeding a prescribed value, wherein the prescribed value of wheel slip is determined in dependence at least in part on vehicle speed.

It is to be understood that because the prescribed value of wheel slip is determined in dependence at least in part on vehicle speed, the prescribed value of wheel torque is also dependent at least in part on vehicle speed.

The prescribed value of wheel slip may be determined in further dependence at least in part on a coefficient of friction between the wheel and the surface.

Optionally, the prescribed value of wheel slip is determined in further dependence at least in part on a value of surface drag experienced by the vehicle.

Optionally, the prescribed value of wheel slip is determined in dependence on vehicle speed only.

Further optionally, the prescribed value of torque is determined in dependence on vehicle speed and a coefficient of friction between the wheel and the surface only.

Optionally, the control system is operable in one of a plurality of respective different driving modes, wherein the prescribed value of wheel slip is determined by reference to vehicle speed and optionally one or more other parameters in dependence on the driving mode in which the control system is operating.

In some embodiments the system may be operable to determine the prescribed value of wheel slip in dependence on selected driving mode and vehicle speed only.

The control system may be operable in an on-highway driving mode suitable for driving on road surfaces with relatively high values of surface coefficient of friction, and that are relatively hard and smooth. The system may be operable when in the on-highway mode to determine the prescribed value of wheel slip by reference to vehicle speed only. Other arrangements are also useful.

The system may be operable when in a grass/gravel/snow mode to determine the prescribed value of wheel slip in further dependence at least in part on a coefficient of friction between the wheel and the surface. Other arrangements are also useful.

The prescribed value of wheel slip may be defined substantially as that at which a maximum amount of tractive force acting to cause movement of the vehicle may be achieved.

The prescribed value of wheel slip may correspond substantially to a prescribed proportion of that at which a maximum amount of tractive force causing movement of the vehicle may be achieved.

The prescribed proportion may correspond to a value less than that at which a maximum amount of tractive force causing movement of the vehicle may be achieved.

The prescribed proportion may correspond substantially to one selected from amongst from greater than or equal to 70% but less than 90% and greater than or equal to 90% but less than 100%.

Alternatively, the prescribed proportion may correspond to a value greater than that at which a maximum amount of tractive force causing movement of the vehicle may be achieved.

The prescribed proportion may correspond substantially to one selected from amongst greater than 100% but less than or equal to 110%, greater than 110% but less than or equal to 120%, and greater than 120% but less than or equal to 130%.

The control system may be operable to limit a rate of increase of applied drive torque to a prescribed maximum value as the value of applied drive torque increases toward the prescribed (maximum allowable) value.

The control system may be operable to limit a rate of increase of applied drive torque to a prescribed maximum value such that the maximum allowable rate of increase decreases as a difference between an amount of drive torque currently applied to the at least one driven wheel and the prescribed (maximum allowable) value of drive torque decreases.

The control system may be configured to determine wheel slip and to determine whether measured wheel slip is consistent with a currently stored value of coefficient of surface friction between the wheel and the driving surface for the amount of drive torque currently applied to the wheel, the control system being configured to update the currently stored value of coefficient of surface friction in the event an inconsistency is identified.

The control system may be operable to limit an amount of drive torque that may be applied to one or more driven wheels of the vehicle so as to prevent an amount of wheel slip from exceeding a prescribed value only when a prescribed torque limit operational mode of the control system is selected.

It is to be understood that the prescribed torque limit operational mode may be the only torque limit mode the vehicle is operable in. Alternatively it may be one of a plurality of torque limit operational modes, being operational modes in which an amount of drive torque applied to a driven wheel is limited to a prescribed amount.

Optionally, the control system is operable to select the prescribed torque limit operational mode when a corresponding selection signal is received.

The selection signal may be generated in response to user actuation of a torque limit mode selector. Alternatively or in addition, the torque limit operational mode may be selected in dependence on a selected driving mode. Thus the torque limit operational mode may be selected automatically when the control system is operating in a prescribed one or more driving modes. For example, the torque limit operational mode may be selected automatically when the control system is operating in a grass/gravel/snow mode. Other arrangements are also useful.

The control system may be operable to limit the amount of drive torque applied to the at least one of the plurality of driven wheels in order to prevent the amount of wheel slip from exceeding the prescribed value at least in part by causing a reduction in an amount of drive torque transmitted from at least one propulsion motor of the vehicle to the at least one wheel. The amount of torque transmitted may be reduced by means of a clutch or any other suitable means.

The control system may be operable to limit the amount of drive torque applied to the at least one of the plurality of driven wheels in order to prevent the amount of wheel slip from exceeding the prescribed value at least in part by application of brake means to the at least one of the plurality of driven wheels.

The control system may be operable to limit the amount of drive torque applied to the at least one of the plurality of driven wheels in order to prevent the amount of wheel slip from exceeding the prescribed value at least in part by reducing an amount of drive torque generated by at least one propulsion motor of the vehicle.

In a further aspect of the invention for which protection is sought there is provided a vehicle powertrain controller comprising a control system according to a preceding aspect.

In a still further aspect of the invention for which protection is sought there is provided a vehicle comprising a control system according to a preceding aspect.

The vehicle may comprise a driver operable selector for selecting the prescribed torque limit operational mode of the control system.

The vehicle may comprise a pair of front wheels arranged to be driven and a pair of rear wheels arranged to be driven.

Optionally, each of the one or more wheels that is arranged to be driven is provided with a respective propulsion motor.

Optionally, each respective one or more propulsion motors comprises an electric propulsion motor.

Alternatively or in addition the vehicle may comprise an engine, optionally an internal combustion engine.

In a further aspect of the invention for which protection is sought there is provided a method of controlling motion of a vehicle over a driving surface by means of a control system, the method comprising:
  limiting an amount of drive torque that may be applied to one or more driven wheels of the vehicle so as to prevent an amount of wheel slip from exceeding a prescribed value.

In a still further aspect of the invention for which protection is sought there is provided a control system for controlling motion of a vehicle over a surface, the control system being operable to limit an amount of drive torque that may be applied to one or more driven wheels of the vehicle to a value corresponding to that for which maximum tractive force may be obtained.

In an aspect of the invention for which protection is sought there is provided a control system for controlling motion of a vehicle over a surface, the control system being operable to limit an amount of drive torque that may be applied to one or more driven wheels of the vehicle to a value greater than that for which maximum tractive force may be obtained by a prescribed proportion.

In one aspect of the invention for which protection is sought there is provided control means for controlling motion of a vehicle over a surface, the control means being operable to limit an amount of drive torque that may be applied to one or more wheels of the vehicle that are arranged to be driven so as to prevent an amount of wheel slip from exceeding a prescribed value.

The term control means as used herein is intended to include, without limitation, a controller such as a microprocessor or the like.

Embodiments of the present invention have the advantage that a risk that a powertrain applies drive torque to one or more driven wheels in such a manner as to cause excessive slip, resulting in a reduction in vehicle stability, may be reduced.

By drive torque is meant a net torque acting on a wheel, applied in order to promote movement of the vehicle and not brake torque, being torque applied to reduce movement of the vehicle. In other words, a net positive torque promoting (and not opposing) motion of the vehicle. In some embodiments the net torque may be a net torque resulting from application of a (positive) drive torque and a (negative) brake torque.

It is to be understood that, for some road wheel/tyre specifications on a given surface (e.g. a given tyre type on dry asphalt), there is a wheel speed offset above the actual vehicle speed above which further wheel slip is not beneficial. This may for example be because it does not lead to an increase in tractive force of the wheel on the driving surface.

For many driving surfaces, the amount of tractive force decreases when the amount of wheel slip exceeds a certain value. In some embodiments the control means may be configured to limit wheel slip to a value that is at or below the value above which increasing wheel slip results in a decrease in tractive force for the surface on which the vehicle is driving. In some alternative embodiments the control means may be configured to limit wheel slip to a value slightly above that value above which increasing wheel slip results in a decrease in tractive force, as described below.

In some embodiments the control means may be arranged to limit the amount of drive torque that may be applied to the one or more driven wheels such that the prescribed value of allowable slip is not exceeded. It is to be understood that, provided the driver demands an amount of drive torque that will not result in the prescribed value of allowable slip being exceeded, the powertrain may be permitted to apply drive torque to the one or more driven wheels in such a manner that the value of driver demanded torque is delivered.

Where two or more wheels are driven by the powertrain, the control means may determine (where possible) an appropriate torque distribution between the two or more wheels such that the prescribed allowable value of slip of each wheel is not exceeded whilst still delivering a total torque (being the sum of the torque values applied to each of the two or more wheels) that is substantially equal to the driver demanded torque.

In some embodiments the control means may take into account possible differences between the value of prescribed allowable slip of different respective driven wheels. For example in the case of a four wheel drive vehicle the control means may take into account the fact that rear wheels of the vehicle may have an increased downward force thereon during periods of acceleration compared with the front wheels. In such a case the rear wheels may have a different maximum value of drive torque that may be applied thereto in order to obtain slip corresponding to the maximum prescribed value compared with the front wheels, when the vehicle is accelerating. The control means may be arranged to take vehicle inclination into account, for example responsive to a signal from an inclination sensor or other means for determining inclination.

Advantageously the control means may be configured to determine a maximum amount of drive torque that may be applied to the one or more wheels to prevent the amount of wheel slip from exceeding the prescribed value.

The control means may be operable to determine the maximum amount of drive torque according to at least one selected from amongst a wheel speed and a coefficient of friction between a wheel and the surface.

It is to be understood that the coefficient of friction may correspond to an estimated value of coefficient of surface friction.

The prescribed value of wheel slip may be defined substantially as that at which a maximum amount of tractive force acting to cause movement of the vehicle may be achieved.

It is to be understood that the maximum amount of acceleration of the vehicle may be achieved when the amount of force causing movement of the vehicle is maximised.

It is well known that, for a given vehicle wheel on a given surface, as the amount of torque applied to the wheel so as to cause longitudinal acceleration of the vehicle/wheel from rest is increased, the net amount of torque causing longitudinal acceleration of the vehicle/wheel typically increases substantially linearly with applied torque, at least initially.

In some cases, such as in the case of a wheel having a rubber tyre in contact with asphalt, above a certain amount of wheel slip the increase in wheel slip required to obtain a given increase in driving force causing longitudinal acceleration begins to increase non-linearly until, above a maximum value, if the amount of torque applied to the wheel continues to increase, the amount of slip increases but the net driving force causing longitudinal acceleration of the wheel begins to decrease.

It is desirable to optimise the amount of drive torque applied to a wheel so as to prevent the amount of wheel slip from becoming excessive, causing a deterioration in certain vehicle performance characteristics such as achievable rate of acceleration on a given surface and lateral stability.

In some embodiments, the control means is configured to limit the amount of drive torque applied to the wheel to that corresponding to that at which the maximum achievable driving (or tractive) force is obtained.

The prescribed value of wheel slip may correspond substantially to a prescribed proportion of that at which a maximum amount of tractive force causing movement of the vehicle may be achieved.

The prescribed proportion may correspond to a value less than that at which a maximum amount of tractive force causing movement of the vehicle may be achieved.

The prescribed proportion may correspond substantially to one selected from amongst from greater than or equal to 70% but less than 90% and greater than or equal to 90% but less than 100%.

It is to be understood that other values or ranges of values are also useful.

Advantageously the prescribed proportion may correspond to a value greater than that at which a maximum amount of tractive force causing movement of the vehicle may be achieved.

The prescribed proportion may correspond substantially to one selected from amongst greater than 100% but less than or equal to 110%, greater than 110% but less than or equal to 120%, and greater than 120% but less than or equal to 130%.

It is to be understood that other values or ranges of values are also useful.

The control means may be operable to limit a rate of increase of applied drive torque to a prescribed maximum value as the value of applied drive torque increases toward the maximum allowable value.

It is to be understood that in some embodiments the limit in respect of maximum allowable rate of increase of drive torque may be imposed only over a prescribed range of applied torque, for example as the amount of applied drive torque reaches a value within (say) 10% or 20% or 30% of the maximum allowable value of drive torque. Other prescribed ranges are also useful.

The control means may be operable to limit a rate of increase of applied drive torque to a prescribed maximum value such that the maximum allowable rate of increase decreases as a difference between an amount of drive torque currently applied to the at least one driven wheel and the maximum allowable value of drive torque decreases.

Thus the prescribed allowable value of rate of increase may be a value imposed responsive to the difference between the amount of drive torque currently applied to the at least one driven wheel and the maximum allowable value, for example a value that is proportional to the difference. Alternatively the prescribed value may be a fixed value, the limit being applied when the difference between the amount of drive torque currently applied to the at least one driven wheel and the maximum allowable value falls below a prescribed value. Other arrangements are also useful.

The control means may be configured to determine wheel slip and to determine whether measured wheel slip is consistent with a currently stored value of coefficient of surface friction between the wheel and the driving surface for the amount of drive torque currently applied to the wheel, the control means being configured to update the currently stored value of coefficient of surface friction in the event an inconsistency is identified.

Thus it is to be understood that the control means may update the value of surface mu used by the control means in response to a determination of wheel slip (for example in response to a measurement of wheel speed and vehicle speed, or using a value of wheel slip provided to the control means) and the amount of torque applied to the wheel. This feature has the advantage that if the value of surface mu changes, for example if a driving surface changes from dry asphalt to ice or vice versa, and an unexpected change in the amount of wheel slip for a given applied torque occurs, the control means is able to update the value of surface mu accordingly.

For example, in the event the vehicle moves from ice to dry asphalt and the control means applies the value of surface mu for the wheel on ice to determine expected wheel slip whilst the vehicle is in fact operating on dry asphalt, the control means may determine that the amount of wheel slip is less than that which is expected and revise the value of surface mu employed accordingly. Other arrangements are also useful.

Optionally the control means may be operable to limit an amount of drive torque that may be applied to one or more driven wheels of the vehicle so as to prevent an amount of wheel slip from exceeding a prescribed value only when a prescribed operational mode of the control means is selected.

Thus the functionality described may only be implemented once a prescribed operational mode has been selected.

The control means may be operable to select the prescribed operational mode when a corresponding selection signal is received.

The prescribed mode may correspond for example to a launch mode.

In a further aspect of the invention for which protection is sought there is provided a vehicle powertrain controller comprising control means according to the preceding aspect.

By combining the control means with a vehicle powertrain controller, a speed of response of the powertrain to control signals provided by the control means may be increased substantially. In some embodiments the control means may otherwise be required to transmit control signals to the powertrain controller via a communications channel such as a controller area network (CAN) bus, introducing a delay between issuance of a communication by the control means and receipt of the communication (and therefore any subsequent response) by the powertrain controller. This delay may be substantially eliminated in some embodiments by providing the control means as part of the powertrain controller.

In a still further aspect of the invention for which protection is sought there is provided a vehicle comprising control means according to a preceding aspect.

Advantageously the vehicle may comprise a driver operable selector for selecting the prescribed operational mode of the control means.

The selector may for example be a launch mode selector as described above.

The control means may be operable to limit the amount of drive torque applied to the at least one of the plurality of driven wheels in order to prevent the amount of wheel slip from exceeding the prescribed value by reducing an amount of drive torque transmitted from the at least one propulsion motor to the at least one wheel.

In some embodiments, disconnection of clutch means or slipping of clutch means may be employed to reduce the amount of drive torque transmitted.

Alternatively or in addition the control means may be operable to limit the amount of drive torque applied to the at least one of the plurality of driven wheels in order to prevent the amount of wheel slip from exceeding the prescribed value by application of brake means to the at least one of the plurality of driven wheels.

Further alternatively or in addition the control means may be operable to limit the amount of drive torque applied to the at least one of the plurality of driven wheels in order to prevent the amount of wheel slip from exceeding the prescribed value by reducing an amount of drive torque generated by the at least one propulsion motor of the vehicle.

The vehicle may comprise a pair of front wheels arranged to be driven and a pair of rear wheels arranged to be driven.

Optionally each of the one or more wheels that is arranged to be driven is provided with a respective propulsion motor.

Optionally each respective one or more propulsion motors comprises an electric propulsion motor.

It is to be understood that since electric propulsion motors can develop relatively high torque values, embodiments of the invention may be particularly suitable for applications in which two, three four or more wheels of a vehicle are each provided with a respective electric propulsion motor.

In some embodiments the control means may be configured to perform a vehicle speed check in order to verify that a vehicle speed employed by the control means corresponds to actual vehicle speed. The control means may perform the speed check by reducing an amount of torque applied to one or more wheels that are arranged to be driven and measuring wheel speed following the torque reduction. In some embodiments the torque may be reduced until wheel speed no longer reduces with reducing amount of torque. In some embodiments the torque may be reduced until a rate of reduction in wheel speed with reducing amount of torque falls below a prescribed value. Other arrangements are also useful. Aspects of this control methodology which may be used to verify vehicle speed are disclosed in UK patent application no. GB1210273.7 which is hereby incorporated herein by reference In another aspect of the invention for which protection is sought there is provided a method of controlling motion of a vehicle over a driving surface by means of control means, the method comprising:

limiting an amount of drive torque that may be applied to one or more driven wheels of the vehicle so as to prevent an amount of wheel slip from exceeding a prescribed value.

In an aspect of the invention for which protection is sought there is provided control means for controlling motion of a vehicle over a surface, the control means being operable to limit an amount of drive torque that may be applied to one or more driven wheels of the vehicle to a value corresponding to that for which maximum tractive force may be obtained.

In a further aspect of the invention for which protection is sought there is provided control means for controlling motion of a vehicle over a surface, the control means being operable to limit an amount of drive torque that may be applied to one or more driven wheels of the vehicle to a value greater than that for which maximum tractive force may be obtained by a prescribed proportion.

The prescribed proportion may for example be one selected from amongst 10%, 20%, 30%, 40% or 50% of the maximum value. Other values are also useful.

This feature has the advantage that the control means may be arranged to allow the amount of wheel slip to increase to a value sufficient to cause a drop in tractive force, allowing the control means to verify more readily (in some arrangements) whether a current value of coefficient of surface friction employed by the control means is substantially correct. As noted above, in some embodiments the control means may monitor an amount of wheel slip as a function of applied drive torque and update the value of coefficient of friction between the wheel and the surface that is used by the control means if the control determines that a discrepancy exists in the observed relationship between wheel slip and applied drive torque. In some embodiments the control means may correlate one or more other parameters such as vehicle acceleration (for example as determined by an accelerometer) with wheel slip or applied drive torque in order to verify the current value of coefficient of friction employed by the control means.

In another aspect of the invention for which protection is sought there is provided a motor vehicle having at least one propulsion motor for generating drive torque to drive the vehicle and control means for controlling motion of a vehicle over a driving surface, the control means being operable to:

estimate a maximum value of allowable slip of one or more driven wheels; and limit an amount of drive torque applied to the one or more driven wheels so as to prevent the amount of wheel slip from exceeding the maximum allowable value.

Within the scope of this application it is envisaged that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless there is incompatibility of features.

BRIEF DESCRIPTION OF THE DRAWINGS

Embodiments of the invention will now be described, by way of example only, with reference to the accompanying figures in which.

DETAILED DESCRIPTION

Figure 1:
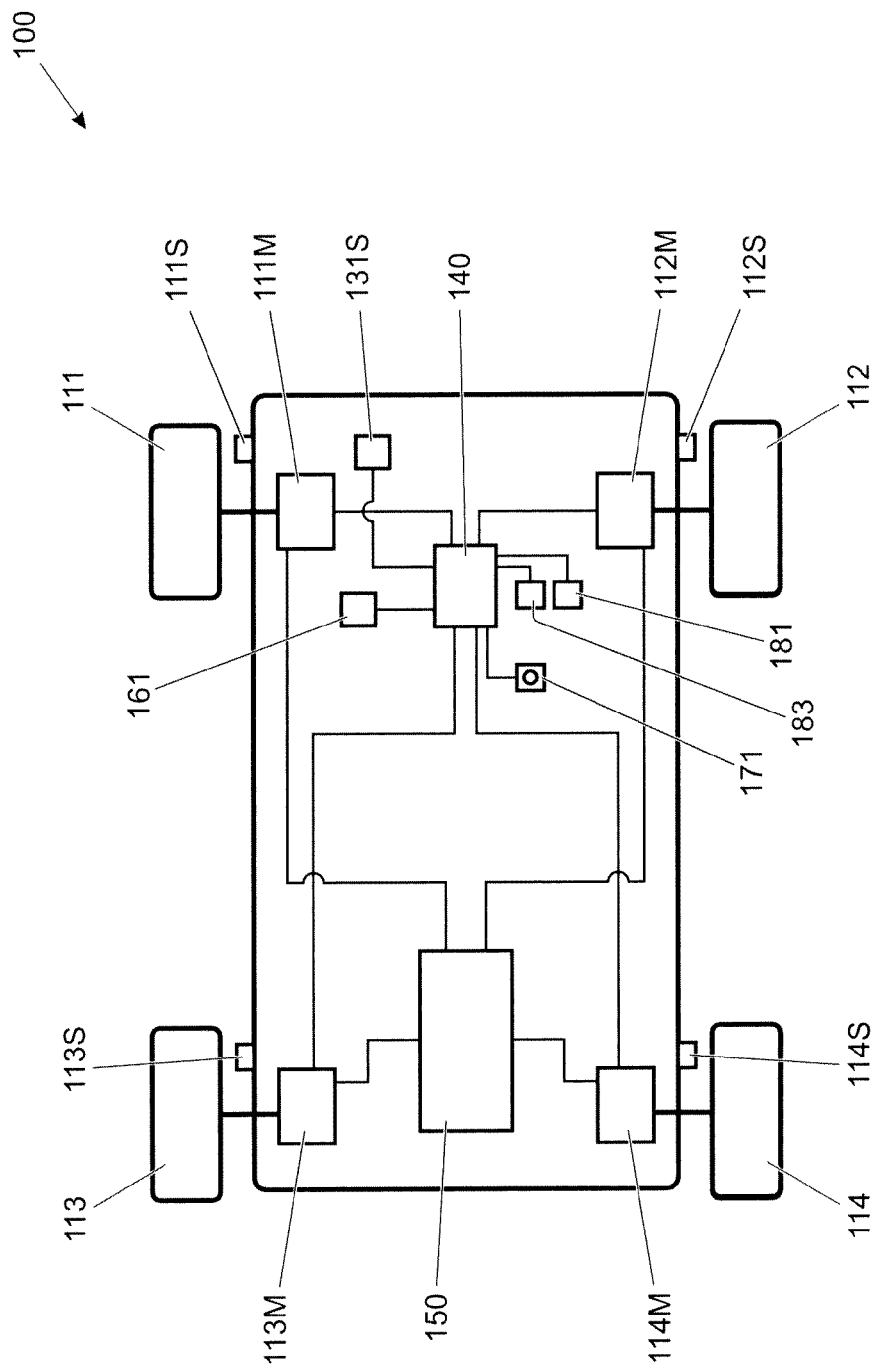
FIG. 1 is a schematic illustration of a vehicle according to an embodiment of the present invention.

FIG. 1 shows a four wheel drive motor vehicle 100 according to an embodiment of the present invention. The vehicle has four wheels 111, 112, 113, 114 each arranged to be driven by a respective electric propulsion motor 111M, 112M, 113M, 114M. The vehicle has a controller 140 configured to control an amount of torque delivered to each wheel 111, 112, 113, 114 by each respective motor individually. A battery 150 supplies power to drive the motors 111M, 112M, 113M, 114M.

The controller 140 is operable to determine an amount of drive torque to be developed at the wheels 111, 112, 113, 114 to drive the vehicle as demanded by a driver of the vehicle responsive to a position of an accelerator pedal 181. An anti-lock braking system (ABS) controller 161 is configured to control braking of the vehicle 100 responsive to a position of a driver brake pedal 183.

In response to driver demand for torque, the controller 140 is configured to control the amount of torque delivered by each of the motors 111M, 112M, 113M, 114M to its respective wheel. The controller 140 is operable to implement a feed forward control methodology in order to reduce a risk that wheel slip occurs due to the application of excessive torque to the wheels 111, 112, 113, 114. It is to be understood that on some driving surfaces it may be possible for a driver to demand an amount of drive torque that would result in wheel spin if the controller 140 were to allow the full amount of torque demanded by the driver to be applied.

Figure 2:
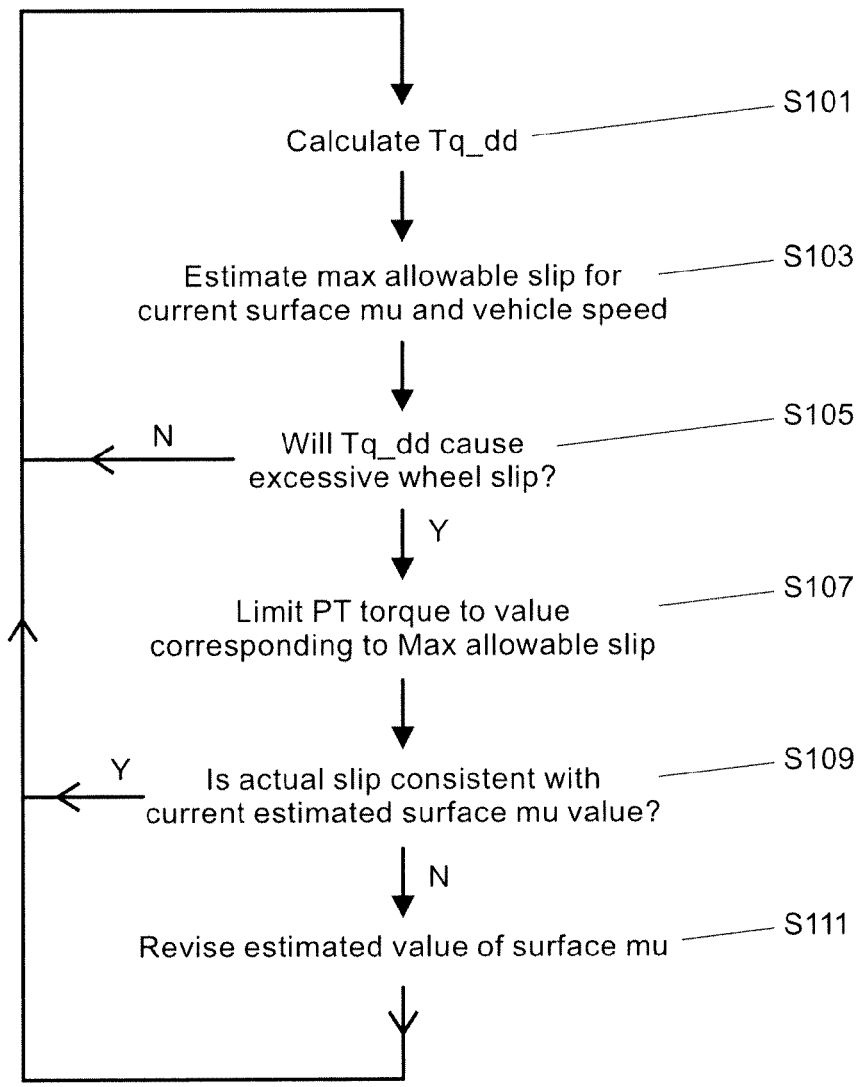
FIG. 2 is a flow diagram of a method of controlling a vehicle.

FIG. 2 is a high level schematic illustration of a sequence of steps performed by the controller 140 during vehicle operations in implementing the feed forward control methodology. It is to be understood that the steps may be implemented in conjunction with one or more other steps, before, between or after the steps illustrated.

In some embodiments the steps are performed whenever the vehicle is being driven. In some embodiments the steps may be performed only if a particular vehicle mode such as a launch control mode, sport mode and/or one or more other modes are selected.

At step S101 the controller 140 determines a current value of driver demanded torque Tq_dd based on accelerator pedal position. In some embodiments one or more other parameters may be employed by the controller 140 in addition to pedal position in order to determine the value of Tq_dd, such as engine speed in some embodiments having an engine. In some embodiments the controller 140 may be provided with a value of Tq_dd that has been determined by a different controller, for example by an engine controller in the case of a vehicle having an engine.

It is to be understood that a torque demand signal from a speed control system such as a cruise control system or off-road speed control system may be employed instead, in some embodiments, if the speed control system is active. The off-road speed control system may be a system operable to control vehicle speed in accordance with a target speed despite the occurrence of wheel slip. The off-road speed control system may be referred to as a low-speed speed control system in some embodiments. The off-road speed control system may be operable only below a certain speed, such as a speed in the range from 30 km/h to 60 km/h, optionally around 50 km/h. Other arrangements are also useful.

At step S103 the controller 140 determines an estimated value of maximum allowable slip, slip_max, that is to be allowed by a wheel for the current driving surface. The determination is made using a current value of coefficient of friction between each wheel and the surface over which the vehicle 100 is moving (referred to herein as 'surface mu' or μ), and a current value of vehicle speed.

It is to be understood that the controller 140 may be arranged to determine the current value of surface mu based on an assumption that the value is 1 (corresponding to dry asphalt) unless the controller 140 determines that a lower value is more appropriate. The controller 140 may for example determine that a lower value is appropriate responsive to detection of wheel slip exceeding that which would be expected on such a surface for given values of one or more of vehicle longitudinal acceleration, lateral acceleration, wheel speed and net torque applied to a wheel.

Figure 3:
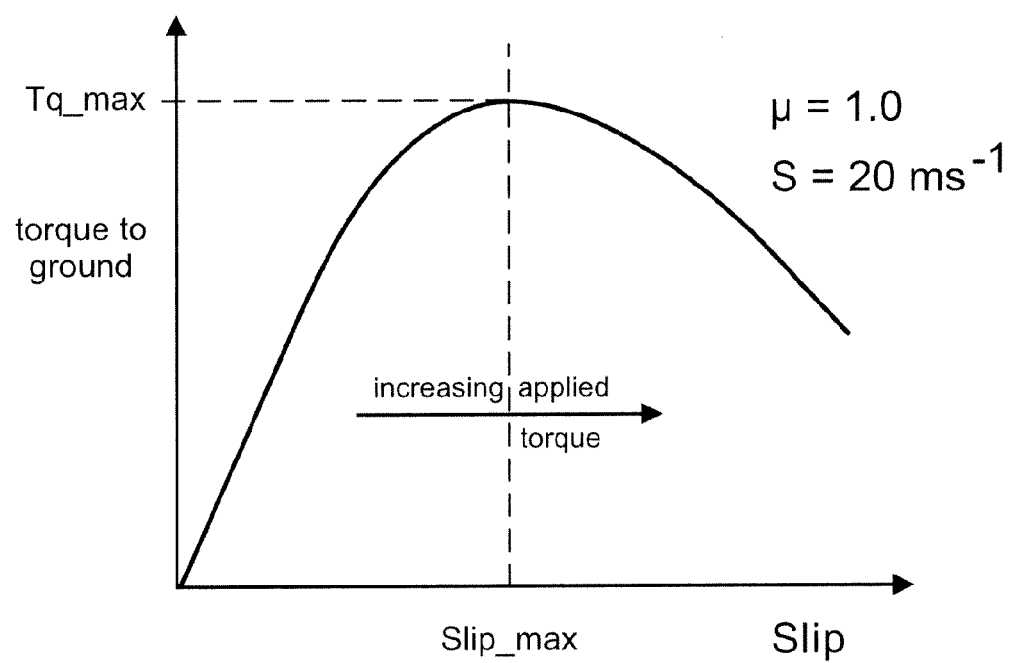
FIG. 3 is a plot of 'torque to ground', which is proportional to 'force to ground' being the useful longitudinal force causing vehicle acceleration due to application of torque to a wheel, as a function of wheel slip (being the ratio of wheel speed to ground speed).

FIG. 3 shows a plot of torque to ground as a function of wheel slip for given values of surface mu (μ) and vehicle speed (s). The amount of torque applied to the wheel (as opposed to the torque to ground, being the useful torque acting to cause longitudinal acceleration) increases with wheel slip as indicated in the figure. It can be seen that as the amount of wheel slip increases the amount of useful torque to ground increases until a maximum value Tq_max is reached, corresponding to a peak driving force on the vehicle. It can be seen that if the amount of torque applied to the wheel increases further, the amount of wheel slip increases but the amount of driving force acting on the vehicle decreases. It is to be understood that the precise values of wheel torque as a function of wheel slip depend on the coefficient of friction between the wheel and the driving surface (which depends for example on the tyre and driving surface) and vehicle speed.

As noted above, at step S103 the controller 140 identifies the value of slip_max, which is a value corresponding to Tq_max, according to the current value of surface mu and vehicle speed. In some embodiments the value of slip_max may be determined for example by reference to one or more look-up tables.

At step S105 the controller 140 determines whether the current value of Tq_dd is sufficiently high to cause excessive wheel slip. In the present embodiment the controller 140 determines how much torque should be applied to each wheel in order to deliver a total torque substantially equal to Tq_dd. Furthermore, in the present embodiment excessive wheel slip is defined as wheel slip in excess of slip_max. The controller 140 can therefore determine the corresponding value of torque to ground, Tq_max.

The controller 140 then determines, for each wheel, whether the amount of torque that would be required to be applied to that wheel in order to meet driver demand would exceed the current value of Tq_max for that wheel. In some embodiments, the controller 140 may be arranged to determine the value of Tq_max from a look-up table, either using a value of slip_max after determining the value of slip_max, or directly, without determining the value of slip_max as an intermediate step.

It is to be understood that because the value of Tq_max for a given wheel may depend on a weight applied to the wheel, the value of Tq_max may be different for different wheels. In the case of a vehicle that is accelerating, it may for example be expected for some vehicles that a weight on rear wheels of the vehicle will be higher than front wheels, and therefore the value of Tq_max may also be higher for the rear wheels compared with the front wheels. In some embodiments the controller 140 is configured to take such variations into account in determining whether Tq_max will be exceeded for one or more wheels. In some embodiments, the controller 140 may estimate an increase in weight borne by rear wheels of the vehicle when the vehicle is accelerating relative to the weight borne when the vehicle is not accelerating. The controller 140 may in addition or instead estimate a decrease in weight borne by front wheels of the vehicle when the vehicle is accelerating relative to the weight borne when the vehicle is not accelerating.

If the current value of Tq_dd is not sufficiently high to cause excessive wheel slip of any of the driven wheels 111, 112, 113, 114 (i.e. the value of torque to be applied to a given wheel will not exceed the value of Tq_max for that wheel) the controller 140 allows the current value of Tq_dd to be delivered via the wheels 111, 112, 113, 114 and continues at step S101.

In some embodiments, the controller 140 may be arranged to distribute torque amongst the wheels 111, 112, 113, 114 in an optimum manner so as to reduce a risk that the amount of torque applied to any one wheel exceeds the value of Tq_max for that wheel.

If at step S105 the controller 140 determines that the current value of Tq_dd is sufficiently high to cause excessive wheel slip if the controller 140 were to attempt to deliver corresponding amounts of torque to each wheel, the controller 140 is configured to limit the amount of torque delivered to each wheel 111, 112, 113, 114 to a value sufficient to allow each wheel to experience slip up to a value slip_max for that wheel.

At step S109 the controller 140 determines whether actual amounts of slip experienced by each wheel 111, 112, 113, 114 as measured by the controller 140 are consistent with the current estimated value of surface mu. If the amounts are consistent, the controller continues at step S101.

If the amounts are not consistent, then at step S111 the controller 140 calculates a revised estimated value of surface mu. The controller then continues at step S101.

In some embodiments, instead of limiting an amount of slip of each wheel to the value slip_max (by limiting the amount of torque applied to a wheel to a value corresponding to Tq_max), the controller 140 may be configured to limit the amount of slip to a value that is less than slip_max, or in some other embodiments to a value that is greater than slip_max.

For example, the controller 140 may be arranged to limit the amount of wheel slip to a value that is 10% greater than slip_max. This feature has the advantage that the controller 140 is able more quickly to identify a situation in which the actual value of coefficient of friction between the driving surface and wheel is greater than the currently estimated value.

In the present embodiment the controller 140 is configured repeatedly to check whether the current value of wheel slip corresponds to the value expected for the currently estimated value of surface mu and vehicle speed. If the amount of wheel slip is limited to value greater than slip_max, then if when the amount of torque applied to a wheel exceeds the estimated value of Tq_max but the amount of wheel slip has not yet reached slip_max, the controller 140 may determine that the actual or prevailing value of surface mu is greater than the currently estimated value. The controller 140 may therefore take steps to remedy this discrepancy. In some embodiments the controller 140 may continue to allow greater values of torque to be applied to a wheel (where this is desirable in order to meet driver demand) and to check the corresponding value of wheel slip to see whether the value has reached slip_max.

In some embodiments, in the event a discrepancy in the value of surface mu is identified the controller 140 may be arranged to increment or decrement the value of surface mu, depending on whether the value of surface mu employed appears to be too low or too high, by a prescribed amount. The prescribed amount may for example be 0.1, 0.05, 0.01 or any other suitable value. The controller 140 may maintain this revised value as the value employed thereby until a determination is again made that the currently estimated value is too low (or too high).

In the present embodiment the controller 140 is arranged to assume that the amount of torque applied to a wheel by the vehicle powertrain corresponds to the amount of reacted torque for values of slip up to slip_max. Other arrangements are also useful.

It is to be understood that embodiments of the present invention implement a feedforward control methodology in order to reduce a risk that a vehicle 100 suffers excessive wheel slip. As noted above excessive wheel slip may be experienced for example during periods of harsh acceleration or whilst operating on a surface having a reduced value of surface mu. It is found that vehicles implementing such a control methodology exhibit significantly enhanced performance characteristics including a substantial reduction in wheel slip during acceleration from rest.

Embodiments of the present invention are also suitable for implementation in vehicles operable in different driving modes such as terrain response modes as described above. A vehicle controller such as controller 140 or other controller of the vehicle may be configured to implement a known Terrain Response (TR)® System of the kind described above in which the controller 140 controls settings of one or more vehicle systems or sub-systems such as a powertrain controller, the ABS controller 161, a suspension system controller (where present) and/or any other vehicle subsystem in dependence on a selected driving mode.

The driving mode may be selected by a user by means of a driving mode selector switch or other control. The driving modes may also be referred to as terrain modes, terrain response modes, or control modes.

In some embodiments, at least four driving modes may be provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow; a 'rock crawl' driving mode suitable for driving slowly over a rocky surface; and a 'mud and ruts' driving mode suitable for driving in muddy and/or rutted terrain. Other driving modes may be provided in addition or instead.

In some embodiments the vehicle may be operable in an automatic driving mode selection condition in which the vehicle is configured to determine automatically the most appropriate driving mode for the prevailing terrain. The vehicle may be provided with sensors (not shown) for sensing a variety of different parameters associated with vehicle motion and status. These may be inertial systems, including for example gyros and/or accelerometers that may form part of an occupant restraint system or any other sub-system requiring data indicative of vehicle body movement. The signals from the sensors may be used to provide, or used to calculate, a plurality of driving condition indicators (also referred to as terrain indicators) which are indicative of the nature of the terrain conditions over which the vehicle is travelling.

The sensors may also include, but may not be limited to, sensors providing continuous sensor outputs to the VCU 10, including wheel speed sensors, as mentioned previously with respect to FIG. 1, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of a stability control system (SCS), a brake pedal position sensor, a brake pressure sensor, an accelerator pedal position sensor, longitudinal, lateral and vertical motion sensors, and water detection sensors forming part of a vehicle wading assistance system.

The controller 140 may also receive a signal from a steering controller. The steering controller may be in the form of an electronic power assisted steering unit (ePAS unit). The steering controller may be arranged to provide a signal to the controller 140 indicative of the steering force being applied to steerable road wheels 111, 112 of the vehicle. This force may correspond to that applied by a user to the steering wheel 171 in combination with steering force generated by the ePAS unit.

The controller 140 may be configured to evaluate the various sensor inputs to determine the probability that each of the plurality of different driving modes (or control modes) for the vehicle subsystems is appropriate.

If the user has selected operation of the vehicle in the automatic driving mode selection condition, the controller 140 may then select the most appropriate one of the control modes and be configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The controller 140 may be operable to determine a maximum allowable value of drive torque that may be applied to one or more wheels of the vehicle that are arranged to be driven so as to prevent an amount of wheel slip from exceeding a prescribed value, the prescribed value being determined in dependence at least in part on vehicle speed and the driving mode in which the vehicle 100 is driving.

For example, in some embodiments if the vehicle is driving in a mode optimised for highway driving (i.e. on relatively smooth surfaces having a relatively high coefficient of friction with the vehicle wheels 111, 112, 113, 114) the maximum allowable value of drive torque may tend towards a higher value in dependence on vehicle speed (the value tending to increase with speed).

In contrast, in some embodiments if the vehicle is driving in a mode optimised for driving on grass/gravel/snow (i.e. relatively smooth surfaces having a relatively low coefficient of friction with the vehicle wheels 111, 112, 113, 114) the maximum allowable value of drive torque may be set to a lower (and in some alternative embodiments to a higher) value than that which would be employed for operation in a highway driving mode. Again, the value of maximum allowable drive torque may tend to increase with vehicle speed.

In some embodiments, the value of maximum allowable drive torque may be calculated in dependence on one or more of a plurality of vehicle parameters, the identity of the parameters employed depending on the driving mode. For example, if the vehicle is operating in the on-highway driving mode, the maximum allowable value of drive torque may be determined in dependence on vehicle speed only. In contrast, if the vehicle is operating in the grass/gravel/snow driving mode, the maximum allowable value of drive torque may be determined in dependence on vehicle speed and coefficient of friction between the driving surface and vehicle wheels. The controller 140 may be provided with real time updates in respect of the instant value of surface coefficient of friction. The real time updates may be provided by means of a controller area network (CAN) bus or by any other suitable means.

It is to be understood that in the case of operation in the on-highway driving mode, the controller 140 may assume that the value of surface coefficient of friction is substantially unity, or close to unity. Similarly, a substantially fixed value of surface coefficient of friction may be employed for one or more other modes in addition or instead.

In the present embodiment, the controller is configured to decrease the maximum allowable value of slip with decreasing surface coefficient of friction.

In some embodiments the controller 140 may be configured to calculate the prescribed value of slip in further dependence on a parameter indicative of an amount of surface drag experienced by the vehicle. It is to be understood that on certain relatively soft terrain such as grass, gravel, snow and sand, surface drag is found to be higher than that experienced on relatively hard, smooth surfaces such as asphalt. The controller 140 may be configured such that as surface drag increases the maximum allowable value of wheel slip is increased. The maximum allowable value may increase with increasing surface drag in some embodiments. In some embodiments the maximum allowable value of wheel slip may be higher for travel in sand mode compared with the grass/gravel/snow mode.

As noted above, embodiments of the present invention have the advantage that significantly enhanced performance characteristics may be enjoyed when operating in off-road and on-road (or on-highway) terrain conditions. Some embodiments of the invention permit a substantial reduction in wheel slip experienced by a vehicle during acceleration from rest over a variety of different types of terrain, compared with acceleration from rest on the same terrain by known vehicles.

Embodiments of the present invention may be understood by reference to the following numbered paragraphs:

1. A control system for controlling motion of a vehicle over a surface, the control system being operable to limit an amount of drive torque that may be applied to one or more wheels of the vehicle that are arranged to be driven to a prescribed torque value so as to prevent an amount of wheel slip from exceeding a prescribed value, wherein the prescribed value of wheel slip is determined in dependence at least in part on vehicle speed.
2. A control system according to paragraph 1 wherein the prescribed value of wheel slip is determined in further dependence at least in part on a coefficient of friction between the wheel and the surface.
3. A control system according to paragraph 1 wherein the prescribed value of wheel slip is determined in further dependence at least in part on a value of surface drag experienced by the vehicle.
4. A control system according to paragraph 1 wherein the prescribed value of wheel slip is determined in dependence on vehicle speed only.
5. A control system according to paragraph 2 wherein the prescribed value of torque is determined in dependence on vehicle speed and a coefficient of friction between the wheel and the surface only.
6. A control system according to paragraph 1 wherein the control system is operable in one of a plurality of respective different driving modes, wherein the prescribed value of wheel slip is determined by reference to vehicle speed and optionally one or more other parameters in dependence on the driving mode in which the control system is operating.
7. A control system as described in paragraph 1 wherein the prescribed value of wheel slip is defined substantially as that at which a maximum amount of tractive force acting to cause movement of the vehicle may be achieved.
8. A control system as described in paragraph 1 wherein the prescribed value of wheel slip corresponds substantially to a prescribed proportion of that at which a maximum amount of tractive force causing movement of the vehicle may be achieved.
9. A control system as described in paragraph 8 wherein the prescribed proportion corresponds to a value less than that at which a maximum amount of tractive force causing movement of the vehicle may be achieved.
10. A control system as described in paragraph 8 wherein the prescribed proportion corresponds substantially to one selected from amongst from greater than or equal to 70% but less than 90% and greater than or equal to 90% but less than 100%.
11. A control system as described in paragraph 8 wherein the prescribed proportion corresponds to a value greater than that at which a maximum amount of tractive force causing movement of the vehicle may be achieved.
12. A control system as described in paragraph 11 wherein the prescribed proportion corresponds substantially to one selected from amongst greater than 100% but less than or equal to 110%, greater than 110% but less than or equal to 120%, and greater than 120% but less than or equal to 130%.
13. A control system as described in paragraph 1 operable to limit a rate of increase of applied drive torque to a prescribed maximum value as the value of applied drive torque increases toward the prescribed value.
14. A control system as described in paragraph 13 operable to limit a rate of increase of applied drive torque to a prescribed maximum value such that the maximum allowable rate of increase decreases as a difference between an amount of drive torque currently applied to the at least one driven wheel and the prescribed value of drive torque decreases.

15. A control system as described in paragraph 1 configured to determine wheel slip and to determine whether measured wheel slip is consistent with a currently stored value of coefficient of surface friction between the wheel and the driving surface for the amount of drive torque currently applied to the wheel, the control system being configured to update the currently stored value of coefficient of surface friction in the event an inconsistency is identified.

16. A control system as described in paragraph 1 operable to limit the amount of drive torque that may be applied to one or more driven wheels of the vehicle to the prescribed value so as to prevent the amount of wheel slip from exceeding the prescribed value only when a prescribed torque limit operational mode of the control system is selected.

17. A control system as described in paragraph 16 operable to select the prescribed torque limit operational mode when a corresponding selection signal is received.

18. A control system according to paragraph 1 operable to limit the amount of drive torque applied to the at least one of the plurality of driven wheels in order to prevent the amount of wheel slip from exceeding the prescribed value at least in part by causing a reduction in an amount of drive torque transmitted from at least one propulsion motor of the vehicle to the at least one wheel.

19. A control system according to paragraph 1 operable to limit the amount of drive torque applied to the at least one of the plurality of driven wheels in order to prevent the amount of wheel slip from exceeding the prescribed value at least in part by application of a brake to the at least one of the plurality of driven wheels.

20. A control system as described in paragraph 1 operable to limit the amount of drive torque applied to the at least one of the plurality of driven wheels in order to prevent the amount of wheel slip from exceeding the prescribed value at least in part by reducing the amount of drive torque generated by at least one propulsion motor of the vehicle.

21. A vehicle powertrain controller comprising a control system as described in paragraph 1.

22. A vehicle comprising a control system as described in paragraph 1.

23. A vehicle as described in paragraph 22 comprising a driver operable selector for selecting the prescribed torque limit operational mode of the control system.

24. A vehicle as described in paragraph 22 comprising a pair of front wheels arranged to be driven and a pair of rear wheels arranged to be driven.

25. A vehicle as described in paragraph 22 wherein each of the one or more wheels that is arranged to be driven is provided with a respective propulsion motor.

26. A vehicle as described in paragraph 25 wherein each respective one or more propulsion motors comprises an electric propulsion motor.

27. A method of controlling motion of a vehicle over a driving surface by means of a control system, the method comprising:
    limiting an amount of drive torque that may be applied to one or more driven wheels of the vehicle to a prescribed torque value so as to prevent an amount of wheel slip from exceeding a prescribed value; and
    determining the prescribed value of wheel slip in dependence at least in part on vehicle speed.

28. A control system for controlling motion of a vehicle over a surface, the control system being operable to limit an amount of drive torque that may be applied to one or more driven wheels of the vehicle to a value corresponding to that for which maximum tractive force may be obtained.

29. A control system for controlling motion of a vehicle over a surface, the control system being operable to limit an amount of drive torque that may be applied to one or more driven wheels of the vehicle to a value greater than that for which maximum tractive force may be obtained by a prescribed proportion.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system that controls motion of a vehicle over a surface, the control system being operable to limit an amount of drive torque that may be applied to one or more wheels of the vehicle that are arranged to be driven to a prescribed torque value so as to prevent an amount of wheel slip from exceeding a prescribed value of wheel slip, wherein the prescribed value of wheel slip is determined in dependence at least in part on vehicle speed, and wherein the control system is operable to increase applied drive torque at a rate of increase, said rate limited to a prescribed maximum value, as the value of applied drive torque increases toward the prescribed torque value.

2. The control system of claim 1, wherein the prescribed value of wheel slip is determined in further dependence at least in part on one or more selected from: a coefficient of friction between the wheel and the surface, and a value of surface drag experienced by the vehicle.

3. The control system of claim 1, wherein the prescribed value of wheel slip is determined in dependence on one of vehicle speed only, vehicle speed and a coefficient of friction between a wheel and the surface only, or reference to vehicle speed and one or more other parameters in dependence on a driving mode in which the control system is operating.

4. The control system of claim 1, wherein the prescribed value of wheel slip is defined substantially as one of: that at which a maximum amount of tractive force acting to cause movement of the vehicle may be achieved, and that at which a maximum amount of tractive force causing movement of the vehicle may be achieved.

5. The control system of claim 1, wherein the prescribed value of wheel slip substantially corresponds to a prescribed proportion of that at which a maximum amount of tractive force causing movement of the vehicle may be achieved, and wherein the prescribed proportion corresponds to a value less than that at which a maximum amount of tractive force causing movement of the vehicle may be achieved.

6. The control system of claim 5, wherein the prescribed proportion substantially corresponds to one selected from amongst from (i) greater than or equal to 70% but less than 90%, and (ii) greater than or equal to 90% but less than 100%.

7. The control system of claim 5, wherein the prescribed proportion corresponds to a value greater than that at which a maximum amount of tractive force causing movement of the vehicle may be achieved.

8. The control system of claim 7, wherein the prescribed proportion substantially corresponds to one selected from amongst (i) greater than 100% but less than or equal to 110%, (ii) greater than 110% but less than or equal to 120%, and (iii) greater than 120% but less than or equal to 130%.

9. The control system of claim 1, operable to increase the applied drive torque at the rate of increase limited to the prescribed maximum value such that a maximum allowable rate of increase decreases as a difference between an amount of drive torque currently applied to the at least one driven wheel and the prescribed value of drive torque decreases.

10. The control system of claim 1, configured to determine wheel slip and to determine whether measured wheel slip is consistent with a currently stored value of coefficient of surface friction between the one or more wheels and the driving surface for the amount of drive torque currently applied to the one or more wheels, the control system being configured to update the currently stored value of coefficient of surface friction in the event an inconsistency is identified.

11. The control system of claim 1, operable to limit the amount of drive torque that may be applied to one or more driven wheels of the vehicle to the prescribed value so as to prevent the amount of wheel slip from exceeding the prescribed value only when a prescribed torque limit operational mode of the control system is selected.

12. The control system of claim 11, operable to select the prescribed torque limit operational mode when a corresponding selection signal is received.

13. The control system of claim 1, operable to limit the amount of drive torque applied to the one or more wheels in order to prevent the amount of wheel slip from exceeding the prescribed value at least in part by performing one or more selected from: causing a reduction in an amount of drive torque transmitted from at least one propulsion motor of the vehicle to the one or more wheels, application of a brake to the one or more wheels, and reducing the amount of drive torque generated by at least one propulsion motor of the vehicle.

14. A vehicle powertrain controller comprising the control system of claim 1.

15. A vehicle comprising a control system that controls motion of the vehicle over a surface, the control system being operable to limit an amount of drive torque that may be applied to one or more wheels of the vehicle that are arranged to be driven to a prescribed torque value so as to prevent an amount of wheel slip from exceeding a prescribed value of wheel slip, wherein the prescribed value of wheel slip is determined in dependence at least in part on vehicle speed, and wherein the control system is operable to increase applied drive torque at a rate of increase, said rate limited to a prescribed maximum value, as the value of applied drive torque increases toward the prescribed torque value.

16. The vehicle of claim 15, comprising a driver operable selector for selecting the prescribed torque limit operational mode of the control system.

17. The vehicle of claim 15, wherein the one or more wheels comprise a pair of front wheels arranged to be driven and a pair of rear wheels arranged to be driven.

18. The vehicle of claim 15, wherein each of the one or more wheels that is arranged to be driven is provided with a respective propulsion motor.

19. The vehicle of claim 18, wherein each respective one or more propulsion motors comprises an electric propulsion motor.

20. A method of controlling motion of a vehicle over a driving surface via a control system, the method comprising:
limiting an amount of drive torque that may be applied to one or more driven wheels of the vehicle to a prescribed torque value so as to prevent an amount of wheel slip from exceeding a prescribed value;
determining the prescribed value of wheel slip in dependence at least in part on vehicle speed; and
increasing applied drive torque at a rate of increase, said rate limited to a prescribed maximum value, as the value of applied drive torque increases toward the prescribed torque value.

\* \* \* \* \*